United States Patent
Parkhurst et al.

(10) Patent No.: US 10,752,353 B2
(45) Date of Patent: Aug. 25, 2020

(54) SYSTEMS AND METHODS FOR AIRCRAFT BALANCE

(71) Applicant: Sikorsky Aircraft Corporation, Stratford, CT (US)

(72) Inventors: Jeffrey Parkhurst, Meriden, CT (US); Mark R. Alber, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 782 days.

(21) Appl. No.: 15/364,166

(22) Filed: Nov. 29, 2016

(65) Prior Publication Data
US 2018/0148161 A1 May 31, 2018

(51) Int. Cl.
*B64C 29/02* (2006.01)
*B64D 1/22* (2006.01)

(52) U.S. Cl.
CPC .............. *B64C 29/02* (2013.01); *B64D 1/22* (2013.01)

(58) Field of Classification Search
CPC .................................. B64D 1/08; B64D 1/22
See application file for complete search history.

(56) References Cited

U.S. PATENT DOCUMENTS

| | | | | |
|---|---|---|---|---|
| 4,152,019 | A * | 5/1979 | Jarman | B64D 1/22 244/137.1 |
| 6,418,989 | B1 * | 7/2002 | Jarman | B64D 1/22 144/336 |
| 8,366,049 | B2 | 2/2013 | Karem | |
| 8,646,728 | B2 * | 2/2014 | Schuster | B64D 1/22 244/1 TD |

* cited by examiner

*Primary Examiner* — Richard R. Green
(74) *Attorney, Agent, or Firm* — Cantor Colburn LLP

(57) ABSTRACT

An adjustable cable attachment system for a VTOL aircraft includes a VTOL airframe. A winch is operatively connected to an underside of the airframe with the aircraft in a horizontal flight mode. An adjustable cable is operatively connected to the winch to adjustably relocate a slung load with respect to the center of gravity of the aircraft to balance the aircraft. A fixed cable is operatively connected to the underside of the airframe with the aircraft in the horizontal flight mode.

5 Claims, 4 Drawing Sheets

SYSTEMS AND METHODS FOR AIRCRAFT BALANCE

BACKGROUND OF THE INVENTION

1. Field of the Invention

The subject invention is directed to aircraft balance, and more particularly, to aircraft balance systems and methods for improving the stability of a tail sitter aircraft.

2. Description of Related Art

In a winged tail sitter type vertical takeoff and landing (VTOL) aircraft, the fuselage is horizontal for normal forward flight, vertical for hovering or alighting, takeoff and landing, and somewhere in between during the transition. The same propulsion system is used for forward flight and for hover, and can either be a ducted fan or an external propeller or rotor.

In some instances, it may be desired to carry loads underneath a winged tail sitter type VTOL aircraft, e.g. loads attached directly to the airframe, or through a sling configuration. Even without a slung load, the stability and longitudinal center of gravity range of a winged tail sitter type VTOL aircraft varies across flight modes, e.g. forward flight, hovering/take-off and landing, and transition. Adding a slung load only further complicates the stability issues with the VTOL aircraft.

The conventional techniques have been considered satisfactory for their intended purpose. However, there is an ever present need for improved systems and methods for improving the balance and stability of an aircraft. This disclosure provides a solution for this problem.

SUMMARY OF THE INVENTION

An adjustable cable attachment system for a VTOL aircraft includes a VTOL airframe. A winch is operatively connected to an underside of the airframe with the aircraft in a horizontal flight mode. An adjustable cable is operatively connected to the winch to adjustably relocate a slung load with respect to the center of gravity of the aircraft to balance the aircraft. A fixed cable is operatively connected to the underside of the airframe with the aircraft in the horizontal flight mode.

In accordance with some embodiments, the fixed cable is operatively connected to the airframe at a position aft of the center of gravity of the aircraft during forward flight. The winch can be mounted to the airframe at a position forward of the center of gravity of the aircraft during forward flight. The adjustable cable can be one of two adjustable cables, and the winch can be one of two winches. Each winch can be mounted to the airframe at a position aft of the center of gravity of the aircraft during forward flight. The fixed cable can be operatively connected to the airframe at a position forward of the center of gravity of the aircraft during forward flight.

In accordance with some embodiments, the fixed cable is one of two fixed cables. Each fixed cable can be operatively connected to the airframe at position forward of the center of gravity of the aircraft during forward flight. The winch can be mounted to the airframe at a position aft of the center of gravity of the aircraft during forward flight.

In accordance with another aspect, a tail sitter aircraft includes a fuselage defining a fuselage axis. A pair of main wings extend opposite from one another radially outward from the fuselage in a lateral direction with respect to the fuselage axis. A nacelle is supported on each main wing defining a nacelle axis extending parallel to the fuselage axis. A pair of vertical tail wings extend opposite from one another radially outward from each nacelle. An adjustable cable attachment system is operatively connected to the fuselage. The adjustable cable attachment system includes a winch operatively connected to at least one of the fuselage or one of the nacelles, an adjustable cable operatively connected to the winch, and a fixed cable operatively connected to at least one of the fuselage or one of the nacelles.

In accordance with some embodiments, the adjustable cable is one of two adjustable cables. The winch can be one of two winches. A first one of the winches can be mounted to a first one of the nacelles and a second one of the winches can be mounted to a second one of the nacelles. A first one of the two adjustable cables can be operatively connected to the first winch and a second one of the two adjustable cables can be operatively connected to the second winch. The fixed cable can be operatively connected to the fuselage at a position forward of the center of gravity of the aircraft during forward flight. Each winch can be mounted to its respective nacelle at a position aft of the center of gravity of the aircraft during forward flight.

In accordance with some embodiments, the fixed cable is one of two fixed cables. A first one of the two fixed cables can be operatively connected to a first one of the nacelles and a second one of the two fixed cables can be operatively connected to a second one of the nacelles. Each fixed cable can be operatively connected to its respective nacelle at position forward of the center of gravity of the aircraft during forward flight. The winch can be mounted to the fuselage at a position aft of the center of gravity of the aircraft during forward flight.

In accordance with some embodiments, the fixed cable is operatively connected to the fuselage at a position aft of the center of gravity of the aircraft during forward flight. The winch can be mounted to the fuselage at a position forward of the center of gravity of the aircraft during forward flight.

In accordance with yet another aspect, a method for balancing a VTOL aircraft carrying a slung load includes carrying a slung load with a VTOL aircraft and adjusting the length of a cable extending from the VTOL aircraft to relocate a slung load with respect to the center of gravity of the VTOL aircraft to balance the VTOL aircraft.

In accordance with some embodiments, adjusting the length of the cable extending from the VTOL aircraft includes adjusting the cable with a winch. The winch can be operatively connected to an underside of the VTOL aircraft in horizontal flight mode. The cable can be a first of a plurality of cables. The method can include maintaining the length of a second cable while adjusting the length of the first cable extending from the VTOL aircraft. The second cable can be operatively connected to an underside of the VTOL aircraft in horizontal flight mode. Adjusting the length of the cable extending from the VTOL aircraft can include determining a desired cable length based on at least one of lift forces, forward thrust forces, flight conditions, load drag forces or load weight. The method can include transitioning the VTOL aircraft from a vertical flight mode to a horizontal flight mode and/or from the horizontal flight mode to the vertical flight mode. Adjusting the length of the cable extending from the VTOL aircraft can include adjusting the cable during the transitioning.

These and other features of the subject invention and the manner in which it is manufactured and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the subject invention without undue experimentation, preferred embodiments thereof will be described in detail herein below with reference to certain figures, wherein.

DETAILED DESCRIPTION OF PREFERRED EMBODIMENTS

Figure 1:
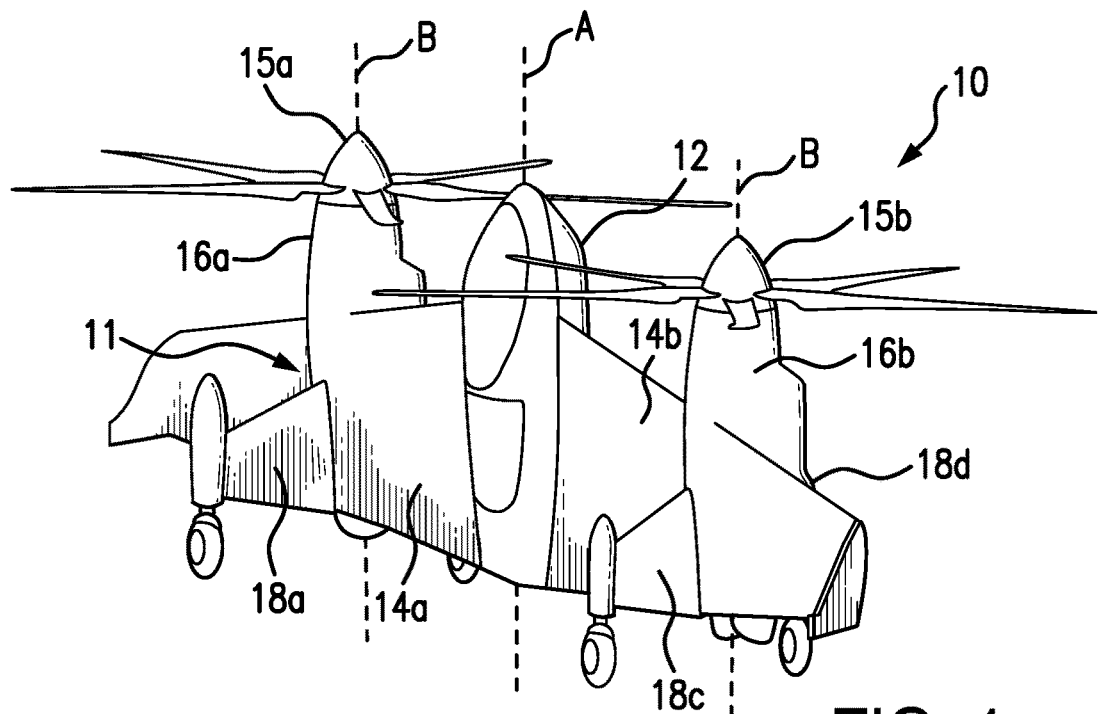
FIG. 1 is a perspective view of a tail sitter aircraft constructed in accordance with an embodiment of the invention, showing the axis of the fuselage extending in a vertical orientation, corresponding to vertical/hovering flight mode.
Figure 2:
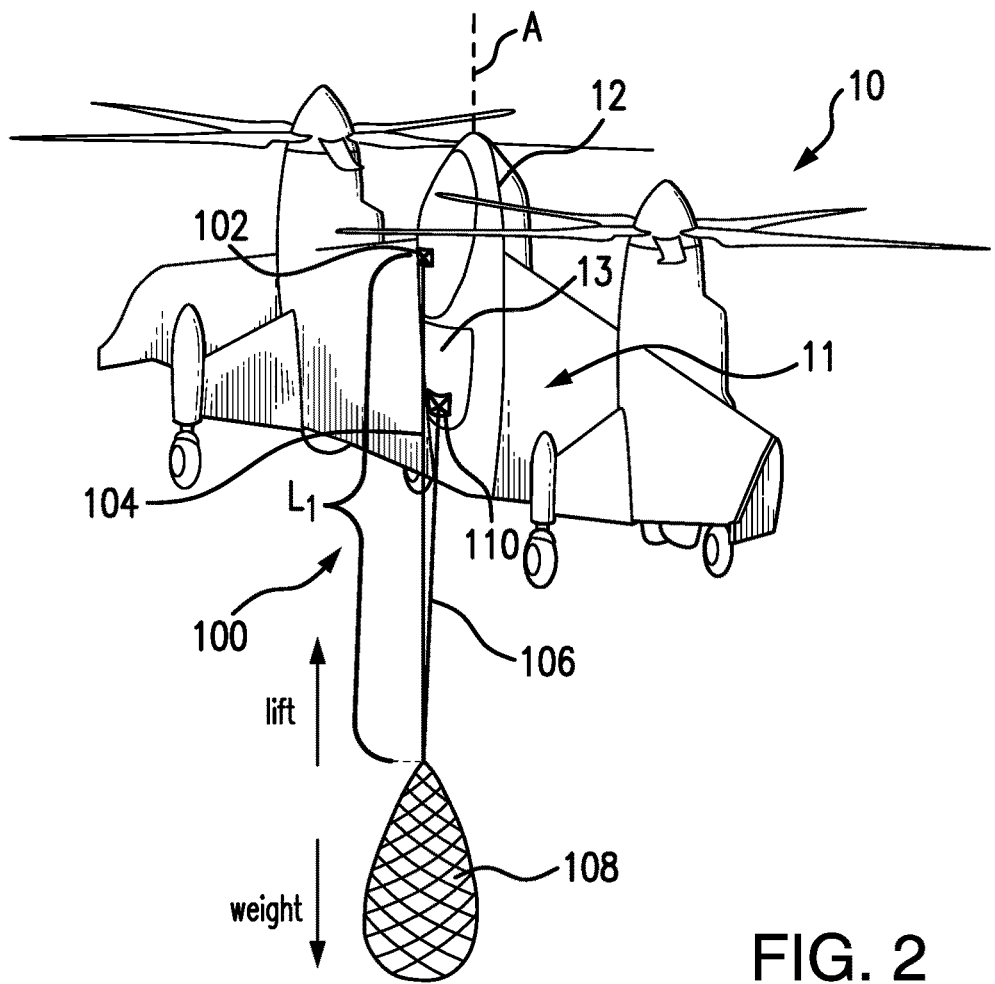
FIG. 2 is a perspective view of the tail sitter aircraft of FIG. 1, showing an adjustable cable attachment system constructed in accordance with an embodiment of the present invention attached to the fuselage of the aircraft with a slung load carried therewith.

Referring now to the drawings, wherein like reference numerals identify similar structural features or aspects of the subject invention. For purposes of explanation and illustration, and not limitation, a schematic depiction of an exemplary embodiment of a tail sitter aircraft, designated generally by reference numeral 10, is illustrated in FIG. 1. A schematic depiction of an exemplary embodiment of an adjustable cable attachment system constructed in accordance with the disclosure is shown in FIG. 2 and is designated generally by reference character 100. Other embodiments of adjustable cable attachments systems in accordance with the disclosure, or aspects thereof, are provided in FIGS. 3-6, as will be described.

As shown in FIG. 1, tail sitter aircraft 10 includes a fuselage 12 defining a fuselage axis A. As illustrated in FIGS. 1 and 2, the fuselage 12 of the aircraft 10 is in a vertical orientation corresponding to a hovering/take-off and landing flight mode. A pair of main wings 14a and 14b extend opposite from one another radially outward from fuselage 12 in a lateral direction with respect to fuselage axis A. Nacelles 16a and 16b are supported on each main wing 14a and 14b, respectively. Each nacelle 16a and 16b defines a respective nacelle axis B extending parallel to fuselage axis A. The nacelles 16a and 16b have respective propellers or rotors 15a and 15b operatively associated therewith. Each nacelle 16a and 16b includes a respective pair of vertical tail wings 18a and 18b (not shown, but opposite from vertical tail wing 18a), and 18c and 18d. Each wing in a given pair extends opposite from the other radially outward from each nacelle 16a and 16b.

As shown in FIG. 2, an adjustable cable attachment system 100 is operatively connected to a VTOL airframe 11, for example, connected directly to fuselage 12.

Adjustable cable attachment system 100 includes a winch 102 operatively connected to fuselage 12. An adjustable cable 104 is operatively connected to winch 102 to relocate slung load 108 with respect to the center of gravity of the aircraft 10 to balance the aircraft 10. Adjustable cable 104 is not itself adjustable, but it is winch 102 that either lets out or pulls in adjustable cable 104 making the length of cable 104 outside of winch 102 (and extending off of fuselage 12 and/or aircraft 10) adjustable so that slung load 108 can be relocated as needed. In the vertical position shown in FIG. 2, a portion of cable 104 extending from fuselage 12 has a first length, $L_1$. A fixed cable 106 is operatively connected to fuselage 12. Fixed cable 106 is attached to fuselage 12 at a hard point 110, e.g. the length of cable 106 is not readily adjustable with respect to fuselage 12. In the vertical position, the lift load, indicated schematically by an upwardly pointing arrow, is balanced by the direction of the weight of the slung load, indicated schematically by a downward pointing arrow.

Figure 4:
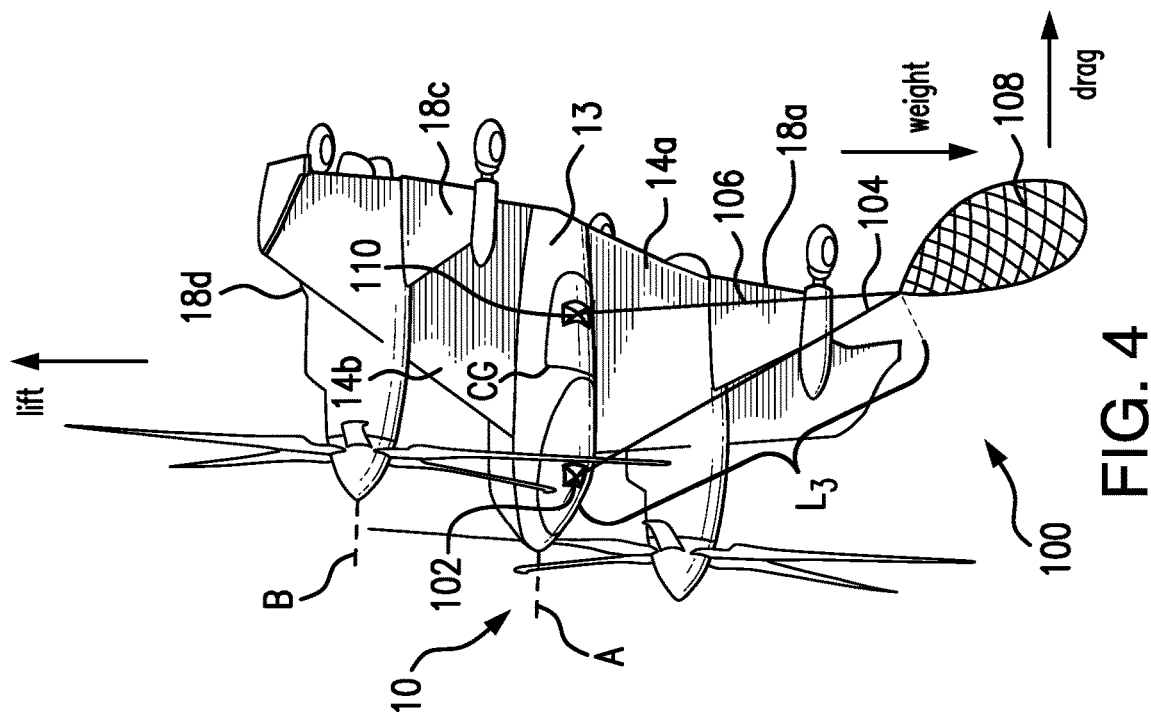
FIG. 4 is a perspective view of the tail sitter aircraft of FIG. 1, showing the aircraft in a horizontal flight mode and the adjustable cable of the adjustable cable attachment system at a third length.
Figure 3:
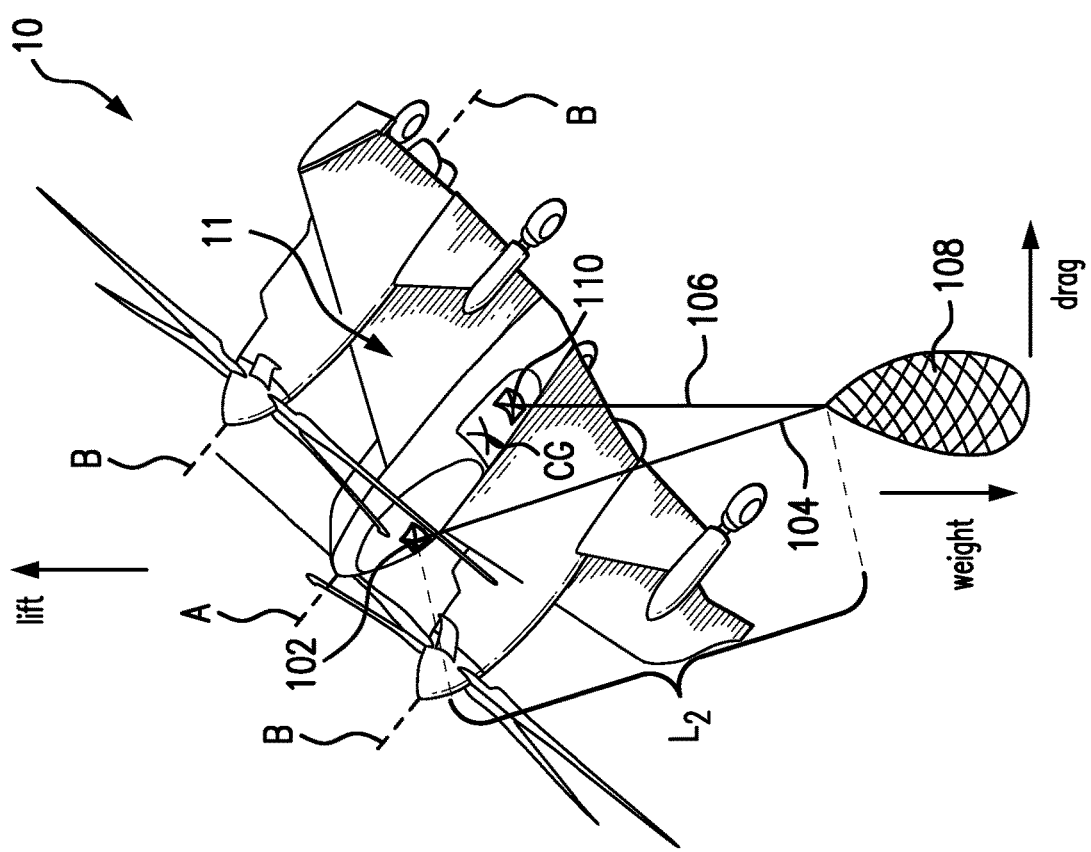
FIG. 3 is a perspective view of the tail sitter aircraft of FIG. 1, showing the aircraft in a transition mode and the adjustable cable of the adjustable cable attachment system at a second length.

FIG. 3 shows aircraft 10 in a transition mode, for example, between a vertical position (FIGS. 1 and 2) and a horizontal position (FIG. 4). When in transition mode, aircraft 10 can be in vertical flight, forward flight, hovering, or some combination thereof. In transition mode, the weight and lift forces that balanced the aircraft in vertical flight cause deviation in the center of gravity CG. Winch 102 is used to adjust the length of cable 104 extending from fuselage 12 to a second length, $L_2$, to reposition the weight of slung load 108 to balance aircraft 10 throughout the transition. Drag forces of slung load 108, indicated schematically by the arrow pointing to the right as oriented in FIG. 3, are also taken into account when determining the center of gravity CG of aircraft 10. $L_2$ is determined by the center of gravity CG of aircraft 10 as it transitions and is continuously and autonomously changing as needed as aircraft 10 goes through transition mode. When it reaches horizontal flight or vertical flight, the length of cable can be $L_1$ or $L_3$, depending on which mode it was transitioning to.

FIG. 4 shows aircraft 10 in a horizontal position during normal forward flight mode. Winch 102 and fixed cable 106 are operatively connected to an underside 13 of the airframe 11 with the aircraft 10 in a horizontal flight mode. When in horizontal flight mode, a portion of cable 104 is at a third length, $L_3$, with respect to fuselage 12. $L_3$ can be adjusted as needed to reposition slung load 108 in order to account for load factors such as weight and drag of slung load 108, and lift and/or thrust forces. $L_3$ is determined by the center of gravity of aircraft 10 for a given state while in horizontal position and can be continuously and autonomously adjusted. When aircraft 10 is in horizontal flight mode, tail wing 18b extends above main wing 14a, while tail wing 18a extends below main wing 14a, and tail wing 18d extends above main wing 14b and tail wing 18c extends below main wing 14b. As shown in FIGS. 3 and 4, fixed cable 106 is operatively connected the fuselage 12 at a position aft of the center of gravity CG of aircraft 10 during forward flight.

Winch 102 is mounted to the fuselage 12 at a position forward of the center of gravity CG of the aircraft 10 during forward flight.

Figure 5A:
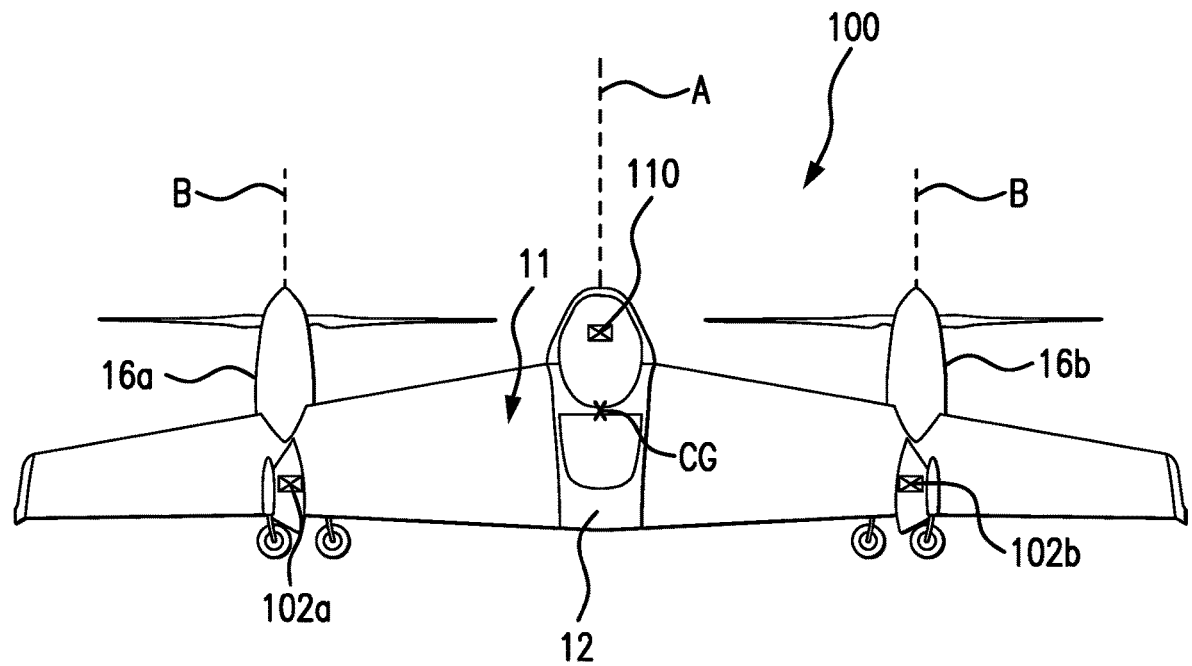
FIG. 5A is side view of the tail sitter aircraft of FIG. 1, showing a portion of another adjustable cable attachment system constructed in accordance with an embodiment of the present invention with winches on each nacelle.

FIG. 5A shows a side view of aircraft 10 with alternative embodiment of adjustable cable attachment system 100. FIG. 5A shows a portion of adjustable cable attachment system in that it shows the connection points for the various adjustable and fixed cables, but, for clarity, does not show the cables themselves. In accordance with the embodiment of FIG. 5A, winch 102 is one of two winches 102a and 102b. Each of winches 102a and 102b is operatively connected to a respective adjustable cable, similar to adjustable cable 104 described above. A first one of the winches 102a is mounted to airframe 11, e.g. to a first one of the nacelles 16a, and a second one 102b of the winches is mounted to airframe 11, e.g. to a second one of the nacelles 16b. Airframe 11 includes a hard point 110 on fuselage 12. Fixed cable, similar to fixed cable 106, described above, is operatively connected to hard point 110 on fuselage 12 at a position forward of center of gravity CG of aircraft 10 during forward flight. Each winch 102 is mounted to its respective nacelle 16a or 16b at a position aft of the center of gravity CG of the aircraft 10 during forward flight. In this embodiment, winches 102a and 102b are used to adjust the position of a slung load, e.g. similar to slung load 108, in a manner similar to that described above with respect to FIGS. 2-4.

Figure 5B:
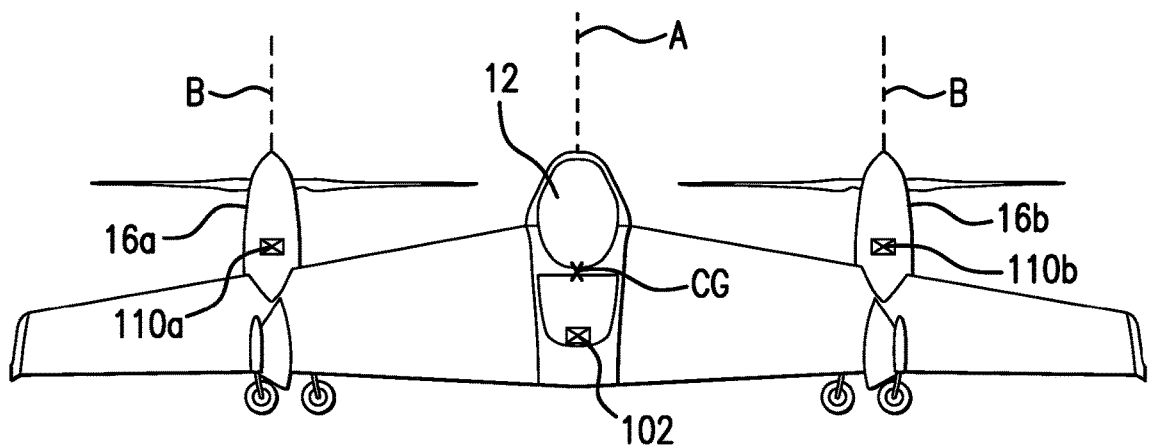
FIG. 5B is side view of the tail sitter aircraft of FIG. 1, showing a portion of another adjustable cable attachment system constructed in accordance with an embodiment of the present invention with hard-points on each nacelle.

FIG. 5B shows an underside view of aircraft 10 with alternative embodiment of adjustable cable attachment system 100. FIG. 5B shows a portion of adjustable cable attachment system 100 in that it shows the connection points (e.g. winches and hard points) for the various adjustable and fixed cables, but, for clarity, does not show the cables themselves. In accordance with the embodiment shown in FIG. 5B, two hard points 110a and 110b are defined on aircraft 10. A first one of the hard points 110a is on a first one of the nacelles 16a and a second one of the hard points 110b is on a second one of the nacelles 16b. A respective fixed cable, similar to fixed cable 106 described above, is operatively connected to each hard point 110a and 110b. Each fixed cable is operatively connected to its respective nacelle 16a or 16b at hard points 110a and 110b forward of the center of gravity CG of the aircraft 10 during forward flight. Winch 102 is mounted to airframe 11, e.g. on fuselage 12, at a position aft of the center of gravity of the aircraft 10 during forward flight. Winch 102 is operatively connected to an adjustable cable, similar to adjustable cable 104 described above. In this embodiment, winch 102 is used to adjust the position of a slung load, e.g. similar to slung load 108, with respect to fuselage 12 in a manner similar to that described above with respect to FIGS. 2-4.

Figure 6:
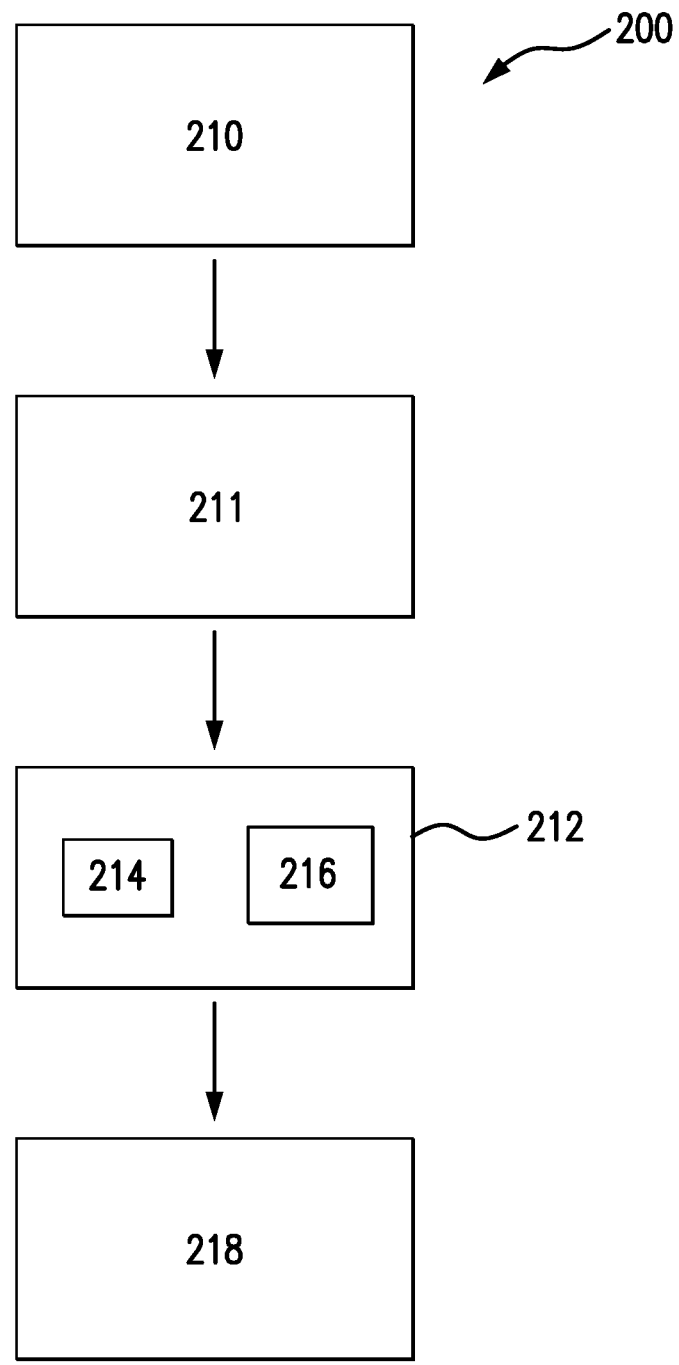
FIG. 6 is a diagram of a method of balancing a VTOL aircraft carrying a slung load in accordance with an exemplary embodiment of the present disclosure.

As shown in FIG. 6, a method 200 for balancing a VTOL aircraft, e.g. aircraft 10, carrying a slung load, e.g. slung load 108, includes carrying the slung load with a VTOL aircraft, as shown schematically by box 210. In some embodiments, method 200 includes transitioning the VTOL aircraft from at least one of a vertical flight mode to a horizontal flight mode, or the horizontal flight mode to the vertical flight mode, as indicated schematically by box 211. Method 200 includes adjusting the length of an adjustable cable, e.g. adjustable cable 104, extending from the aircraft to relocate the slung load with respect to the center of gravity CG of the VTOL aircraft 10 to balance the VTOL aircraft 10, as shown schematically by box 212. Adjusting the length of the cable extending from the aircraft includes adjusting the length of the cable extending from the aircraft during the transitioning. Adjustable cable can also be adjusted during hover/vertical flight mode.

With continued reference to FIG. 6, adjusting the length of the cable includes determining a desired cable length based on at least one of lift forces, forward thrust forces, flight conditions, load drag forces or load weight, as shown schematically by box 214. These will all be influenced by the type of flight mode the VTOL aircraft is in, e.g. vertical flight or hovering, transition, or forward flight. Adjusting the length of the cable extending from the aircraft includes adjusting the cable with a winch, e.g. winch 102, as indicated schematically by box 216. Method 200 includes maintaining the length of a second cable, e.g. fixed cable 106, while adjusting the length of the first cable extending from the aircraft, as shown schematically by box 218. For embodiments with one or more adjustable cables, method 200 includes adjusting more than one cable with respective winches. And, for embodiments with more than one fixed cable, method 200 includes maintaining the length of more than one fixed cable.

The systems and methods of the present disclosure, as described above and shown in the drawings, provide for systems and methods for improving the stability of an aircraft across a variety of flight modes, such as a tail sitter aircraft. The systems and methods described herein provide superior properties including enhanced multi-mission capability of a tail-sitter aircraft by enabling the tail sitter aircraft to carry external loads. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. An adjustable cable attachment system for a VTOL aircraft, the system comprising:
    a VTOL airframe having a hard point located at a first distance along a longitudinal axis of the VTOL airframe, wherein the longitudinal axis is parallel to a fuselage axis;
    a winch operatively connected to an underside of the airframe at a second distance along the longitudinal axis with the aircraft in a horizontal flight mode, wherein the second distance is separate from the first distance;
    an adjustable cable operatively connected to the winch to adjustably relocate a slung load with respect to the center of gravity of the aircraft to balance the aircraft; and
    a fixed cable operatively connected to the underside of the airframe at the hard point with the aircraft in the horizontal flight mode, such that a length of the fixed cable is not readily adjustable with respect to the airframe.

2. A system as recited in claim 1, wherein the fixed cable is operatively connected to the airframe at a position aft of the center of gravity of the aircraft during forward flight.

3. A system as recited in claim 1, wherein the winch is mounted to the airframe at a position forward of the center of gravity of the aircraft during forward flight.

4. A system as recited in claim 1, wherein the adjustable cable is one of two adjustable cables, and wherein the winch is one of two winches, wherein each winch is mounted to the airframe at a position aft of the center of gravity of the aircraft during forward flight, and wherein the fixed cable is operatively connected to the airframe at a position forward of the center of gravity of the aircraft during forward flight.

5. A system as recited in claim 1, wherein the fixed cable is one of two fixed cables, wherein each fixed cable is operatively connected to the airframe at position forward of the center of gravity of the aircraft during forward flight, wherein the winch is mounted to the airframe at a position aft of the center of gravity of the aircraft during forward flight.

* * * * *